(12) United States Patent
Maley et al.

(10) Patent No.: US 12,297,621 B2
(45) Date of Patent: May 13, 2025

(54) AUTOMATIC WORK MACHINE CONDITION MONITORING AND CONTROL MODULE

(71) Applicant: Caterpillar Inc., Peoria, IL (US)

(72) Inventors: Jacob C. Maley, Germantown Hills, IL (US); Justin Lee Steinlage, Mackinaw, IL (US)

(73) Assignee: Caterpillar Inc., Peoria, IL (US)

( * ) Notice: Subject to any disclaimer, the term of this patent is extended or adjusted under 35 U.S.C. 154(b) by 65 days.

(21) Appl. No.: 18/126,700

(22) Filed: Mar. 27, 2023

(65) Prior Publication Data

US 2024/0328115 A1    Oct. 3, 2024

(51) Int. Cl.
| | |
|---|---|
| *E02F 9/20* | (2006.01) |
| *B60Q 5/00* | (2006.01) |
| *E02F 9/22* | (2006.01) |
| *E02F 9/24* | (2006.01) |
| *F01M 5/00* | (2006.01) |
| *F02N 11/08* | (2006.01) |

(52) U.S. Cl.
CPC ............... *E02F 9/20* (2013.01); *B60Q 5/005* (2013.01); *E02F 9/226* (2013.01); *E02F 9/24* (2013.01); *F01M 5/005* (2013.01); *F02N 11/0803* (2013.01); *F02N 11/0862* (2013.01); *F02N 2200/061* (2013.01)

(58) Field of Classification Search
CPC .... E02F 9/20; E02F 9/226; E02F 9/24; B60Q 5/005; F01M 5/005; F02N 11/0803; F02N 11/0862; F02N 2200/061
See application file for complete search history.

(56) References Cited

U.S. PATENT DOCUMENTS

| | | |
|---|---|---|
| 5,990,800 A | 11/1999 | Tamaki et al. |
| 6,351,703 B1 | 2/2002 | Avery, Jr. |
| 7,647,908 B1 | 1/2010 | Biondo et al. |
| 9,435,312 B2 | 9/2016 | Neet |
| 10,018,171 B1 * | 7/2018 | Breiner ............... F02N 11/0818 |
| 10,132,259 B1 | 11/2018 | Watson et al. |
| 11,180,354 B2 | 11/2021 | Hubert |

* cited by examiner

*Primary Examiner* — Xiao En Mo

(57) ABSTRACT

An automatic condition monitoring and control system for a work machine may include an electronic control module configured for arrangement on the work machine. The electronic control module may be configured to monitor multiple conditions of the work machine and compare the multiple conditions to respective thresholds. The electronic control module may also be configured to start an engine of the work machine based on at least one of the comparisons, activate a heating or cooling system based on at least one of the comparisons, or both.

20 Claims, 9 Drawing Sheets

AUTOMATIC WORK MACHINE CONDITION MONITORING AND CONTROL MODULE

TECHNOLOGICAL FIELD

The present application relates generally to work machines such as excavators, haul trucks, road graders, rotary mixer, milling machines, paving equipment and other work machines or fleets of work machines. More particularly, the present application relates to monitoring machine conditions and automatically activating and deactivating systems to adjust the conditions. Still more particularly, the present application relates to automatically monitoring and controlling battery charge, heating, cooling, and other features when a work machine is not in operation.

BACKGROUND

Work machines may sit idle for relatively long periods of time. For example, in-service work machines may sit idle overnight or over weekends or over other even longer periods of time where work is not being performed. Out-of-service work machines may sit idle at dealerships, rental facilities, or in storage yards of construction companies, for example. When work machines sit idle, various conditions may change resulting in a work machine that is inoperable, unsuitable for starting, or just undesirable to operate. For example, the work machine may be inoperable if the battery loses charge or it may be unsuitable for starting if the fluids are frozen or overly viscous. In some cases, the cab or operator station may become cold and undesirable or uncomfortable to operate. Moreover, machine performance may suffer and/or be less than ideal when fluids or other systems are overly cold or overly hot.

U.S. Pat. No. 6,351,703 describes a system and method for controlling an internal combustion engine having an electronic engine controller to automatically start the engine at a programmable day/date and time. The method includes determining a current day/date and time, comparing the current day/date and time to a day/date and time previously stored in the programmable memory for automatically starting the engine, determining whether current conditions are acceptable for automatically starting the engine, and controlling the engine to automatically start the engine beginning at the programmed day/date and time. U.S. Pat. No. 7,647,908 describes a method for remotely starting an engine of a vehicle. The method includes assessing a state of charge of the vehicle battery. The method also includes providing a first type of remote start request to the vehicle if the state of charge of the vehicle battery is greater than a predetermined threshold, and providing a second type of remote start request to the vehicle if the state of charge of the vehicle battery is less than or equal to the predetermined threshold.

SUMMARY

In one or more examples, an automatic condition monitoring and control system for a work machine may include an electronic control module configured for arrangement on the work machine. The electronic control module may be configured to monitor multiple conditions of the work machine and compare the multiple conditions to respective thresholds. The electronic control module may also be configured to start an engine of the work machine based on at least one of the comparisons, activate a heating or cooling system based on at least one of the comparisons, or both.

In one or more examples a method of automatically monitoring and controlling a work machine may include activating an automatic condition monitoring and control module and monitoring one or more conditions of a work machine with the work machine turned off. The method may also include requesting a battery charge, a heating/cooling operation, or both based on the monitoring.

DETAILED DESCRIPTION

Figure 1:
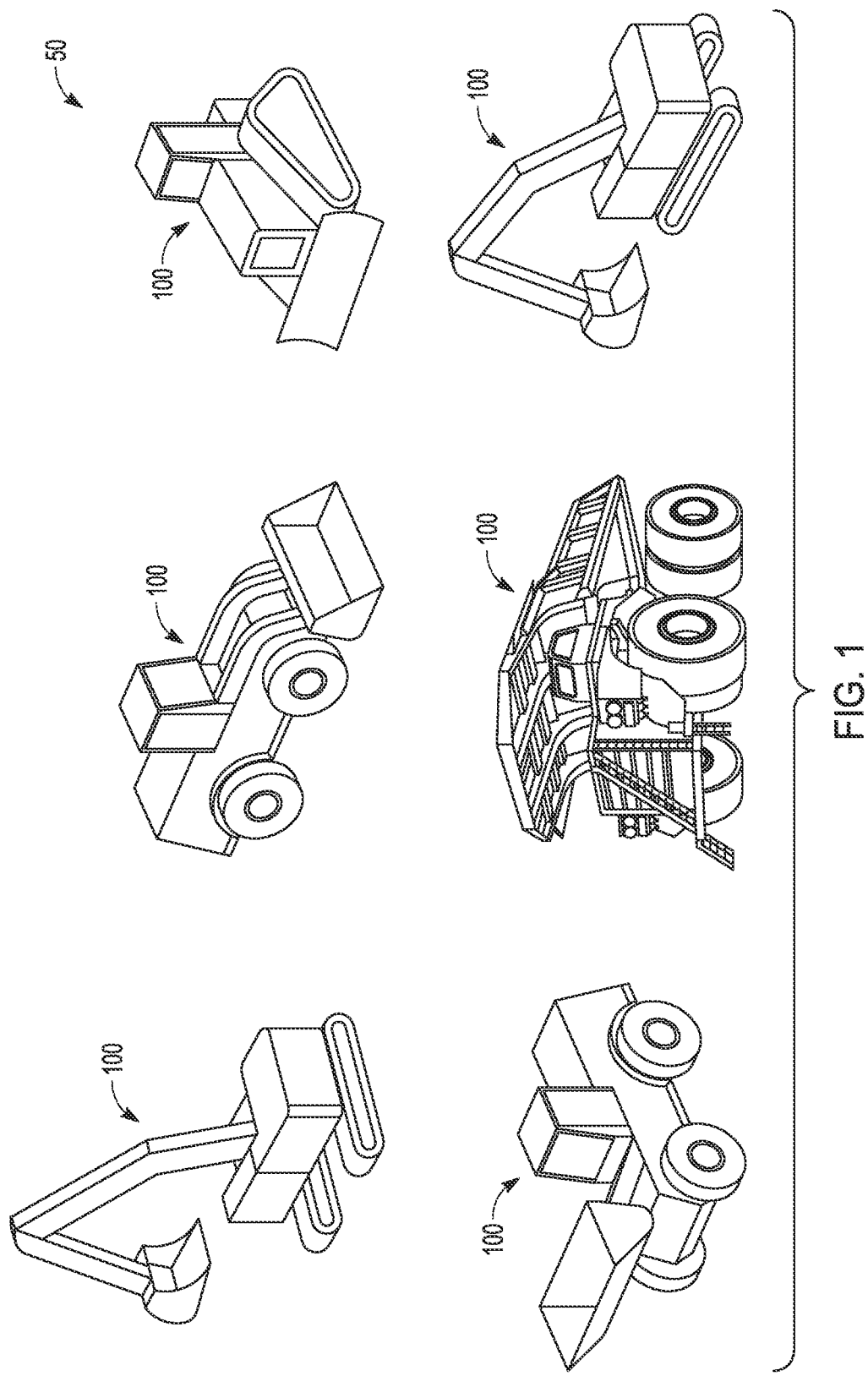
FIG. 1 is a perspective view of a fleet of work machines having automatic start/stop systems, according to one or more examples.

FIG. 1 is a perspective view of a fleet 50 of work machines 100 having automatic condition monitoring and control systems, according to one or more examples. As shown, a fleet 50 of work machines on a work site, at a dealership, at a storage facility, or at other locations may include a large variety of work machines 100 such as an excavator, a front-end loader, a dozer, a haul truck, or other types of work machines. Each of these work machines 100 may be equipped with an automatic condition monitoring and control system to maintain the conditions of particular operating systems within selected parameters and/or to ready the machine for work, use, or other operation, for example.

Figure 2:
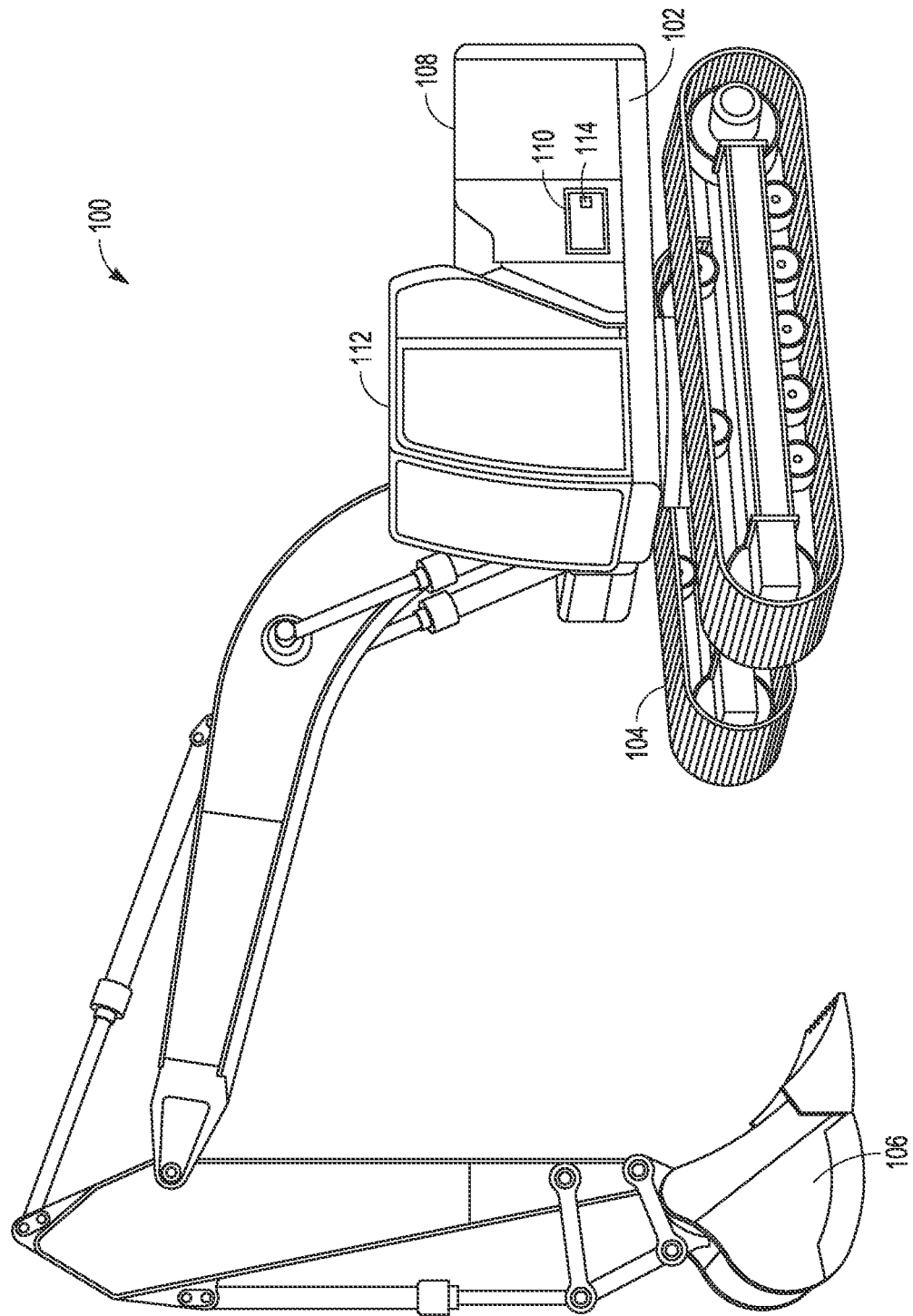
FIG. 2 is a close-up perspective view of a haul truck of the fleet of FIG. 1 and having an automatic start/stop system according to one or more examples.

As shown in FIG. 2, a given work machine 100, in this case an excavator, may include a frame 102, a ground engaging system 104 for moving the work machine along a ground surface, and a work implement 106 for performing work. In the case, of an excavator, the grounding engaging system 104 may be a track system, but other work machines 100 may include axle/wheel systems such as those shown on the haul trucks of FIG. 1. Again, in the case of an excavator, the implement 106 may include a hydraulic arm and bucket, but other work machines may include a lift bucket, a dump body, a dozer blade, or other implement 106 for performing the work of the work machine 100. With continued reference to FIG. 2, and in the case of any of the work machines 100, the work machines may include a main power source 108 such a combustion engine for providing motive power to the ground engaging system and for supplying rotational power to a pump of a hydraulic system and/or a brake system, for example. That is, the implement 106 of the work machine 100 may be a hydraulically driven implement and the hydraulic system for operating the implement may include a hydraulic reservoir, a pump, and a valve system for controlling the implement 106. An additional power source may be provided such as a battery for providing starting power to the main power source and/or for running auxiliary electronic systems, powering onboard computing device such as an electronic control module 110 and for other lower power systems. The work machines 100 may also include an operator station 112, which may take the form of a cab and include an operator chair or seat and a variety of input/output devices allowing the operator to interact with and control the work machine 100. In one or more examples, the operator station 112 may be a remote operator station arranged at an offboard location.

While the work machine 100 has been described as being powered by a combustion engine, battery powered work machines and equipment may also be provided. The present described system incorporates options for both types of equipment and where a trigger occurs to adjust a machine condition, the system may function slightly differently for the combustion engine system than for the battery powered work machine. Without going into detail here, suffice to say, that these differences will be apparent from a review of the various aspects of the disclosure.

With continued reference to FIG. 2, the work machines 100 may include an electronic control module (ECM) 110 for controlling one or more aspects of machine operation. The electronic control module 110 may be adapted to interact with an operator to receive control commands from the operator station 112 and relay control signals to one or more aspects of the work machine 100 based on the control commands. The ECM may also be configured for automatically operating one or more portions of the work machine 100. The ECM may include a processor and a computer readable storage medium having computer-implemented instructions stored thereon. The computer-implemented instructions may include instructions for interacting with the operator station or for automatic operation and instructions for generating control signals for one or more aspects of the work machine, such as the motive system, the hydraulic system for operating the implement, and/or other features or aspects of the work machine. The computer-implemented instructions may include software, hardware, or a combination of software and hardware adapted to perform the outlined tasks. The ECM may include input and output terminals that allow for receiving signals from the operator station, from remote control systems, from sensors, and/or from other equipment on or off the work machine. The ECM may also include output terminals for sending control signals to the various aspects or features of the machine or for communicating with offboard equipment or systems. In one or more examples, the ECM may include a receiver or transceiver for transmitting and/or receiving signals, which may include short range wireless signals (e.g., Bluetooth, Wi-Fi, Zigbee, etc.) or long-range wireless signals such as a cellular or mobile network.

Figure 3:
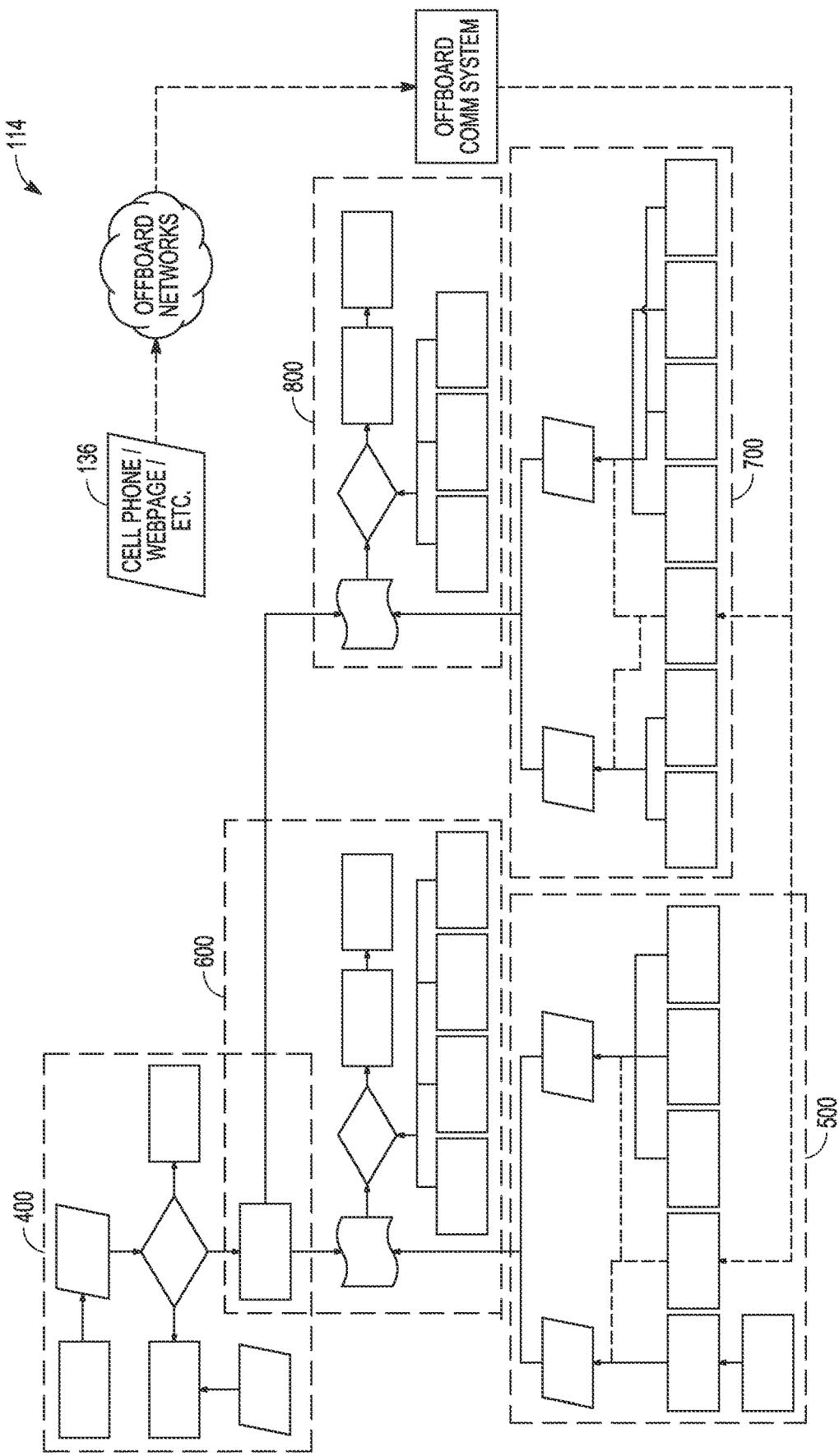
FIG. 3 is automatic start/stop logic map depicting automatic start/stop logic, according to one or more examples.

In one or more examples, the computer-implemented instructions on the ECM may include an automatic condition monitoring and control module 114. As shown in FIG. 3, the automatic condition monitoring and control module may include a relatively comprehensive monitoring system for monitoring a variety of work machine conditions or parameters to determine whether the a particular aspect of the work machine should be automatically activated or automatically deactivated. Still further, the automatic condition monitoring and control module 114 may include processes for automatically activating/deactivating particular aspects of the work machine and protocols associated with both processes.

Figure 4:
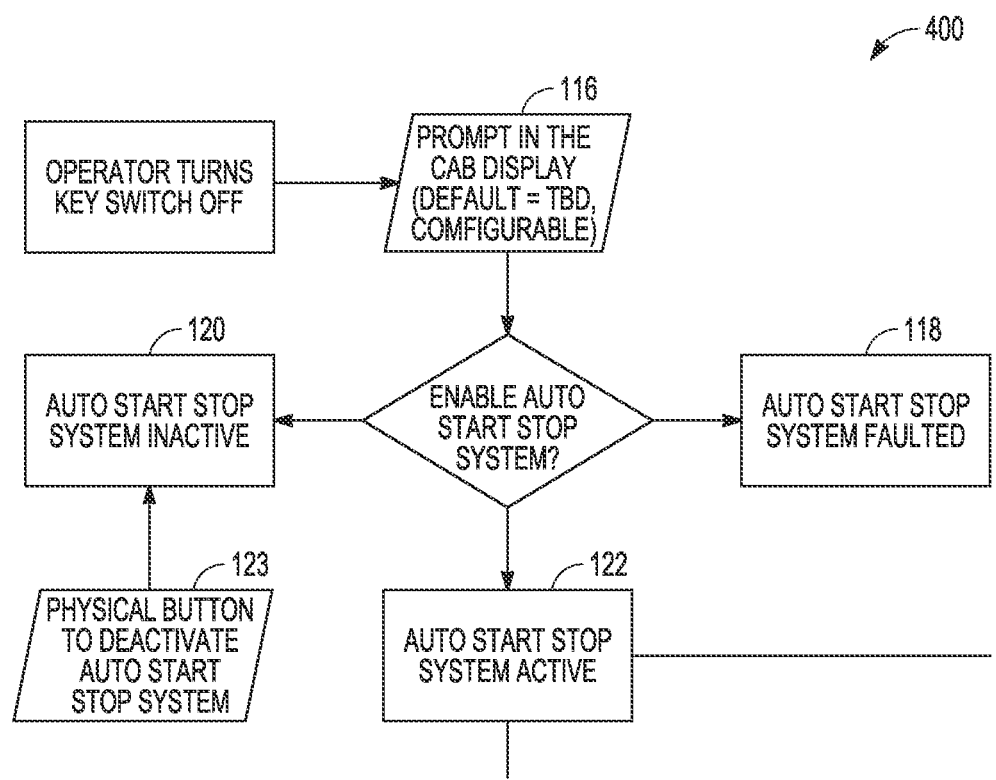
FIG. 4 is a close-up of an activation sequence of the start/stop logic of FIG. 3, according to one or more examples.

As shown in FIG. 3 and in closeup view 400 in FIG. 4, the automatic condition monitoring and control module 114 may be triggered to operate when the work machine is turned off by an operator. In one or more examples, at shutoff, the automatic condition monitoring and control module 114 may prompt the operator to activate the system. For example, a prompt 116 on a touch screen or a light, flashing light, sound, or other attention catching feature may be provided on, at, or near a button, switch or other control allowing the operator to touch the touchscreen, push the button, or flip the switch to activate the automatic condition monitoring and control module 114. In other examples, the automatic module 114 may automatically be activated upon shutdown of the work machine. In the case of a prompt 116, the automatic module 114 may be inactive if the operator does not take action to activate it or it may be active 122 if the operator does take action to activate it. In the case of automatic activation, the automatic module 114 may be active 122 after shutdown of the machine 100. In either case, should there be a problem with the automatic module 114, and while activation signals have been received (either from the operator or automatically), the system may fault 118 and be inactive 120 as a result. In the faulted stated, an onboard notification such as a light, flashing light, sound or other notification may be provided to the operator. Additionally or alternatively, the ECM may transmit a notification to an offboard location to notify management personnel of the fault.

In some examples, as shown, a deactivation feature 123 may be provided in the cab or at ground level, for example. The deactivation may be useful, for example, where a user is approaching the machine to inspect a compartment near the engine and hears the horn indicating the engine is about to start, they may quickly actuate the deactivation button, switch, or other deactivation device to cancel the sequence.

Figure 7:
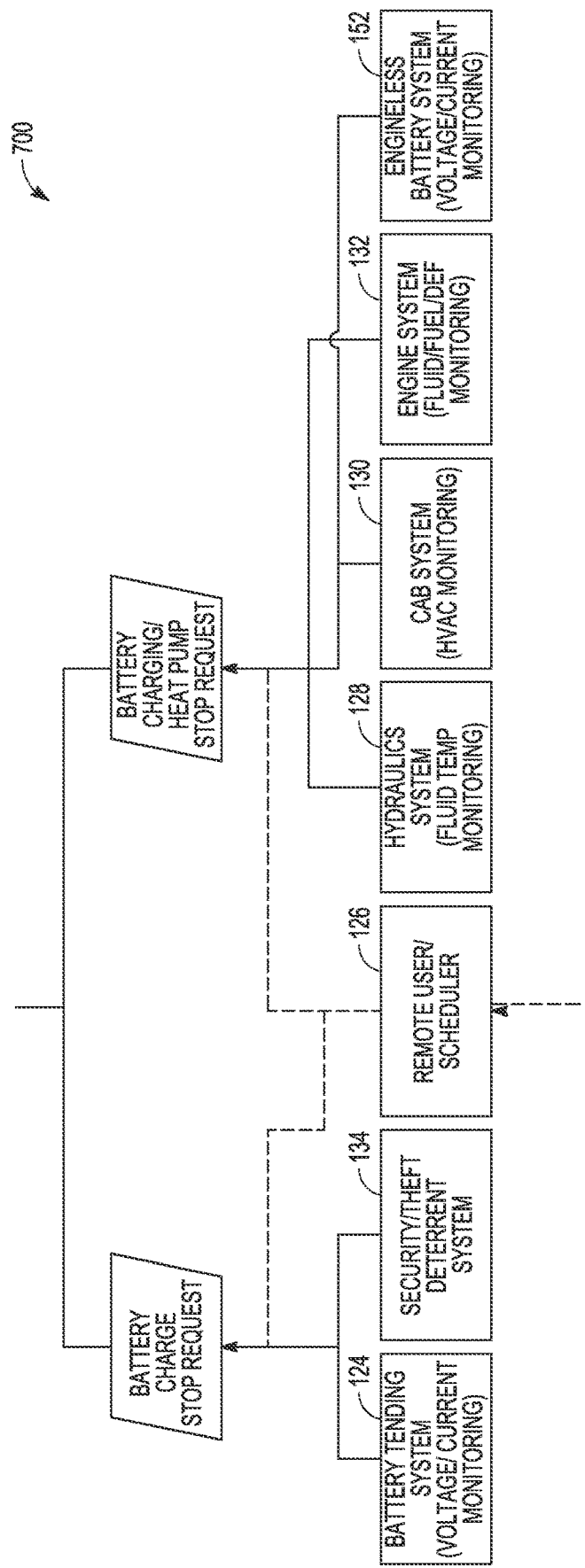
FIG. 7 is a close-up view of a series monitoring components adapted to request shutdown of the start/stop logic of FIG. 3, according to one or more examples.
Figure 8:
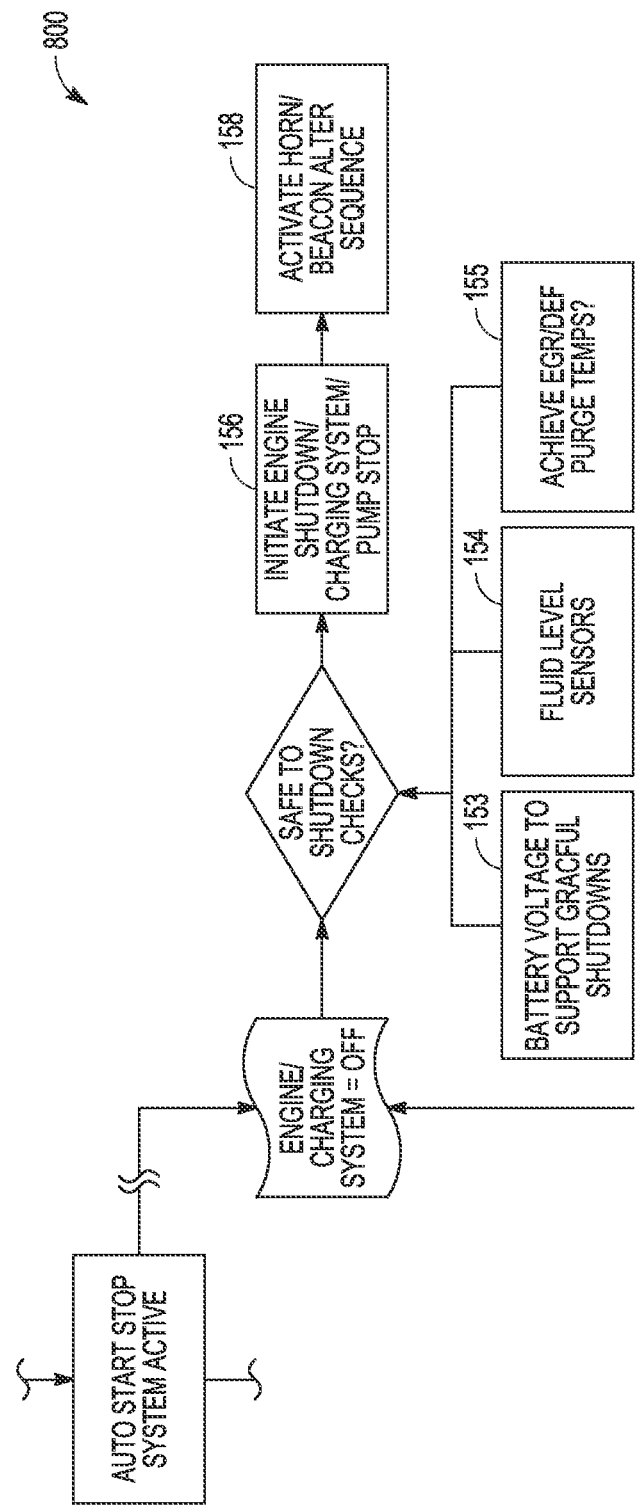
FIG. 8 is a close-up view of a the shutdown process of the start/stop logic of FIG. 3, according to one or more examples.
Figure 9:
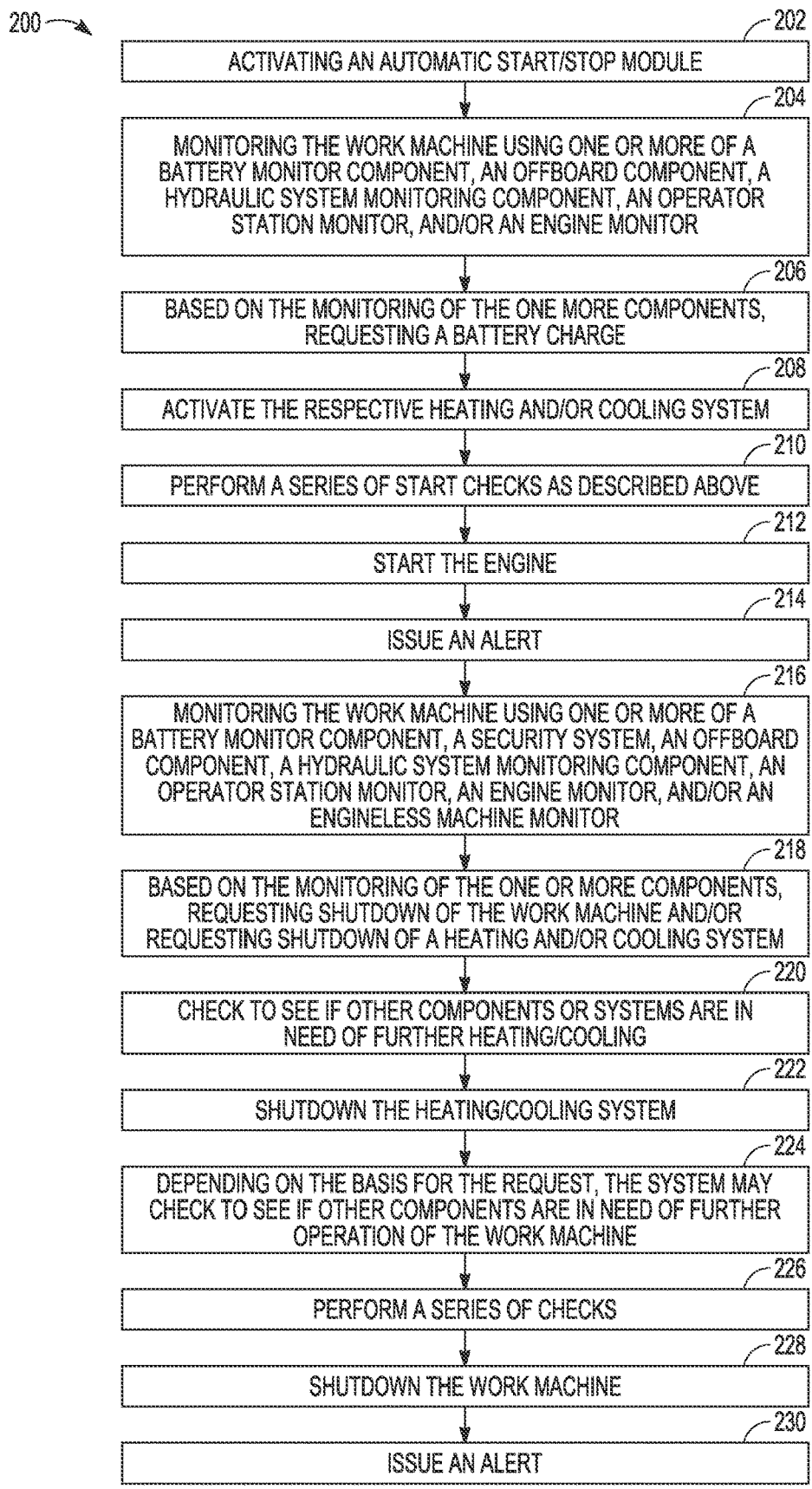
FIG. 9 is a method diagram depicting a method of automatically starting/stopping a work machine, according to one or more examples.

In the case of an active automatic module 122, the module 114 may monitor the work machine to determine if the work machine is currently in an "on" or an "off" state. In one or more examples, the work machine 100 may include sensors for determining this such as one or more motion sensors within the engine, current or voltage sensors arranged downstream of an alternator, or other sensors indicative of the engine running (i.e., "on") or the engine not running (i.e., "off"). In the case of a battery powered system, current/voltage sensors may be used. Initially, upon activation of the module, the work machine would normally be in an "off" state so we will discuss this aspect of the system first with a focus on close-up views 500 and 600 of FIGS. 5 and 6. However, as is noted below, if the automatic module 114 takes action to activate an aspect of the work machine, then the module may turn to the other aspects of FIG. 3 and shown in close-up views 700 and 800 in FIGS. 7 and 8 depicting when aspects of the work machine are "on" such that it may determine if/when to turn an aspect of the work machine off.

Figure 5:
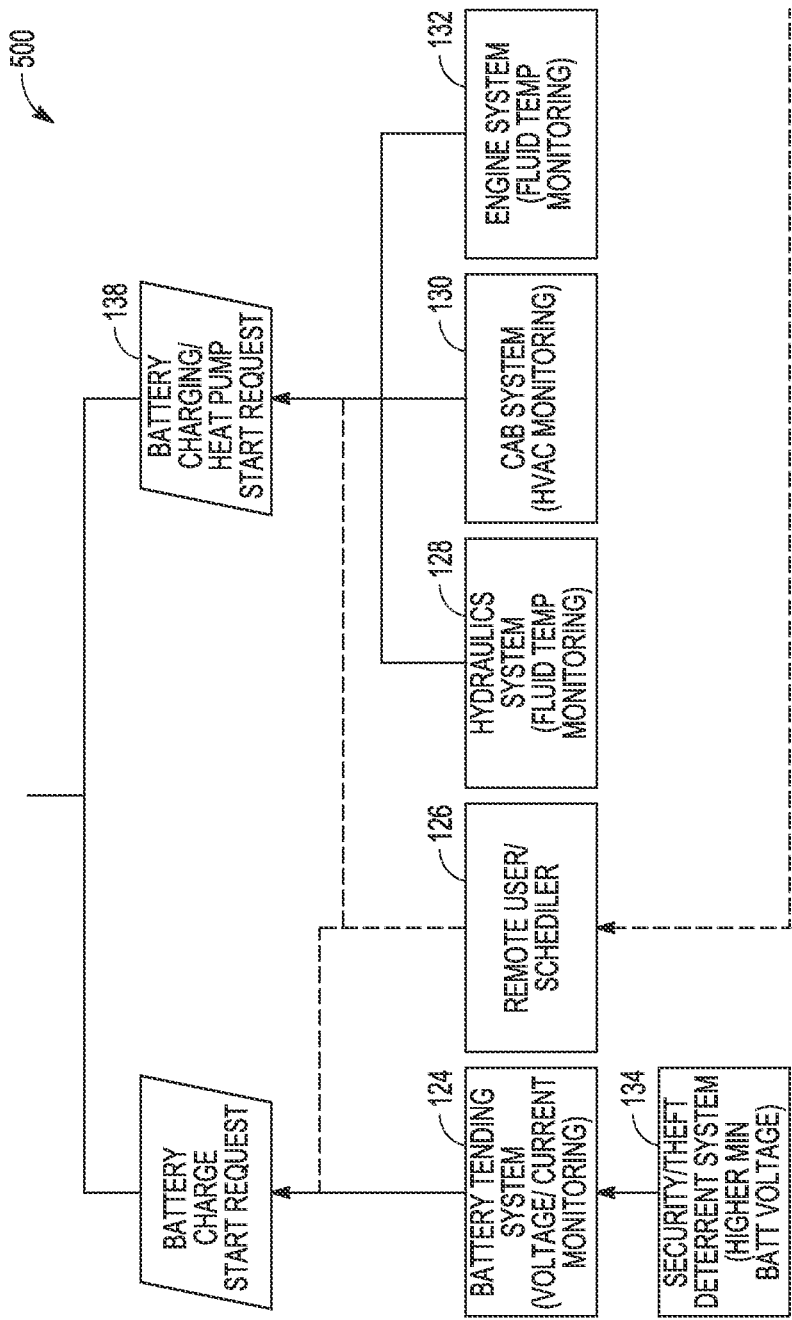
FIG. 5 is a close-up of view of a series of monitoring components adapted to request charging/starting of the start/stop logic of FIG. 3, according to one or more examples.

With continued reference to FIG. 3 and in closeup view 500 of FIG. 5, when the work machine is off or a particular aspect of the work machine is off, the module may monitor a variety of machine conditions that may give rise to actions to turn on the machine or to activate heating/cooling systems, for example. As shown, the automatic module 114 may include a battery monitor component 124, an offboard component 126, a hydraulic system monitoring component 128, an operator station monitor 130, and/or an engine monitor 132. Each of these monitoring systems will be discussed in turn. It is to be appreciated that, while each of these monitoring components has been named and will be described separately below, these components may take the form of software subroutines or combinations of hardware and software and, as such, the term component should not be construed to refer to an individual physical component. Rather, the several monitoring components may simply be portions of a larger automatic module 114, which may also be a software program, routine, or subroutine within the larger electronic control module software.

The battery monitor component 124 may be configured to monitor battery conditions to determine if turning the machine on would be helpful to improve or maintain the battery condition. For example, where equipment sits for long periods of time, the state of charge of the battery may decrease. In another example, where cold weather conditions are present, the state of charge of the battery may also decrease. Still further, even when off, the battery experiences parasitic loads, which can decrease the state of charge of the battery. In one or more examples, the battery monitor component 124 may monitor the voltage and/or the current of the battery and may compare the monitored voltage and/or current to a minimum voltage and/or current threshold stored on the computer readable storage medium of the ECM. Where the comparison is such that the monitored voltage and/or current of the battery approaches, meets, or falls below the threshold, the battery monitor component may call for starting the work machine 100 (e.g., a combustion engine).

In one more examples, the above-referenced threshold may be a single threshold or multiple thresholds may be provided. For example, one threshold may include a starting threshold where the minimum voltage and/or current threshold is determined based on the amount of power required to start the engine of the work machine 100. In one or more examples, the threshold may be set at or slightly above the power required to avoid having the state of charge of the battery fall below a level where it would otherwise be able to start the work machine. In another example, a security system 134 may be provided on the work machine and it may rely on battery power to operate such that it may be operable when the work machine is off. The security system 134 may require a minimum amount of voltage/current to operate and the minimum voltage and/or current threshold may be selected to avoid falling below the amount of voltage/current needed to operate the security system. In some cases, the voltage and/or current level for operating the security system may be higher than the voltage and/or current level needed to start the work machine 100. Still other thresholds may be used such as an amount of voltage and/or current needed for safety or work lighting or an amount of voltage and/or current to operate communication systems for communicating with offboard facilities. Still other thresholds for the battery monitor component may be provided.

In one or more examples, the thresholds may be selectable based on operator or manager preferences allowing the user of the work machine 100 to tailor the threshold for the type of downtime conditions anticipated. For example, fewer thresholds may be used when placing the work machine 100 in storage (e.g., security only or engine start and security) than when leaving the work machine 100 overnight on an otherwise active worksite, for example (e.g., engine start, security, work lighting, communication). In one or more examples, the thresholds may be arranged in order so the operator or other user may appreciate, when selecting a single threshold, which machine operations will be available (e.g., all machine operations with a lower threshold).

The offboard component 126 may be configured to interface with one or more offboard control systems 136 (see FIG. 3) to trigger starting the machine 100 based on information received from offboard personnel, systems, and/or equipment. In one or more examples, the offboard component 126 may monitor work schedules that may be established and/or controlled at a scheduling or other worksite management facility. In one or more examples, the offboard component 126 may monitor the date/day and/or time, may compare that to the scheduled work time, and may start the combustion engine of the work machine 100 or activate heaters/coolers, or other features ahead of the start time on the schedule so as to prepare the work machine 100 for operation. The work machine 100 may then be ready for operation upon the arrival of an operator and/or upon the control of the work machine 100 by a remote operator. In still other examples, the offboard component 126 may monitor service appointments at a dealership, for example. Other use cases may also be envisaged where the machine use is anticipated and/or scheduled and starting the machine 100 or activating aspects of the machine 100 ahead of the use time is desirable. In one or more examples, the offboard component 126 may periodically or continuously update the operation schedule, appointment schedule or other schedule. In other examples, the offboard facility or tool 136 may push updates to the work machine 100 periodically or continuously or when changes to the schedule occur. In one or more examples, the scheduling may occur at a central work machine scheduling facility or by way of an app on a phone of a worker, manager, or other personnel.

In one or more examples, the amount of time prior to the scheduled start time (e.g., lead time) may be a standard and/or selected time such as 5 minutes, 10 minutes, 15 minutes, 20 minutes, 30 minutes, or another selected time. This lead time may be selected based on the anticipated amount of time the work machine 100 needs to "warm up" such as the amount of time the work machine 100 needs to get the engine block and fluids up to a normal operating temperature or to get the cab up to, or down to, a desired temperature. In one or more examples, the offboard component 126 may interface with other monitoring components such as, for example, the hydraulic system monitoring component 128, the operator station monitor 130, and/or the engine monitor 132. That is, for example, these monitors 128/130/132 may monitor, among other things, the temperature of hydraulic fluid, the operator station 112, and the engine 108 or engine oil, respectively. The offboard component 126 may interface with these other monitoring systems to receive these temperatures and adjust the lead time for starting the work machine 100 based on how long it may take to get the respective systems up to temperature. Accordingly, if the ambient temperature around the work machine 100 is cold and the work machine components are also cold, a longer lead time may be provided. Similarly, if the ambient temperature is hot, the lead time may be adjusted to allow an air conditioning system to cool the cab to a suitable temperature. In one or more examples, the amount of time to bring the work machine 100 or a component thereof to a suitable operating temperature may be calculated based on a current temperature of the work machine 100, a surrounding or ambient temperature including a wind chill factor, or other parameters.

As the portal for offboard communications and instructions, the offboard component 126 may also function to start or activate the machine when a remote operator is operating the machine. That is, for example, if a remote operator desires to operate the machine 100 and the machine 100 is not already running due to a scheduled operation time, the remote operator may trigger starting of the machine via the offboard component 126. A remote operator may also enable/disable the automatic condition monitoring and control module 114. For example, a remote operator may be planning to use the machine soon and want to get it warmed up or the remote operator may be switching away from the machine and going to another machine where they want to leave the 1st machine with the automatic module 114 in an active state. In another example, a person or computer system a further distance from the machine where cell/LAN network are used may execute regular requests relating to the automatic module 114. This could be on a day-by-day basis or part of a larger weekly schedule of machine usage. This could also involve an immediate start request, delayed start request, or enablement/deactivation of the automatic module 114. This could also involve setting the HVAC configurations (e.g., desired temps) or other configurations relating to the automatic module 114. In another example, a person near the machine using WiFi, Bluetooth, or other short-range wireless or using a cellular network that desires to use the machine soon may want to start it or enable the automatic module 114. In addition, the security system 134 may leverage the offboard communication capabilities of the offboard component 126 to notify management or other personnel of a security breach, for example. Depending on the nature of the request, the offboard component may send signals to request battery charge or activate heating/cooling devices, for example.

The hydraulic system monitoring component 128 may be configured to monitor the hydraulic system and call for starting the machine 100, activate heaters, or otherwise address particular conditions of the hydraulic system. For example, the hydraulic monitoring component 128 may monitor the temperature of the hydraulic fluid in the hydraulic system and may use one or more threshold temperatures to trigger starting of the machine 100. In one or more examples, the temperature threshold may be based on a relationship between the temperature of the hydraulic fluid and the viscosity of the hydraulic fluid. That is, as hydraulic fluid decreases in temperature, it may become more viscous, which may create higher pressures or even damage in the hydraulic system were the system to operate with the fluid at these colder temperatures. Accordingly, when the temperature of the hydraulic fluid approaches, meets, or falls below the threshold, the hydraulic system monitoring component may call for starting the machine 100 to activate hydraulic fluid heaters. Alternatively, the hydraulic monitoring component 128 may, more simply, activate an electrically powered heat pump or other heater to heat the hydraulic fluid without fully starting the machine 100. This may be particularly suitable for battery powered equipment, for example.

The operation station monitor 130 may be configured to monitor the conditions of the operator station 112 and take measures to control the environment or conditions within the operator station. For example, the operator station monitor 130 may monitor the temperature within the cab of the operator station 112 and may use high temperature and/or low temperature thresholds to trigger starting of the machine 100 or directly activating heaters/cooler such that the cab temperature may be heated up or cooled. In one or more examples, the high and/or low temperature thresholds may be selected to avoid damage to finishes, materials, electronics, or other temperature sensitive items within the operator station 112. When the temperature of the cab at the operator station approaches, meets, or exceeds the high temperature threshold, the operator station monitor 130 may call for starting the machine 100 to activate a cooling system and cool the cab down. Alternatively or additionally, the operator station monitor 130 may, more simply, activate an electrically powered cooling system or heat pump to cool the cab. Alternatively or additionally, the operator station monitor 130 may open one or more vents on the cab to allow natural airflow therethrough and/or to release heat or the operator station monitor 130 may automatically activate internal shades, tinting, or other devices for limiting the entry of sunlight into the cab. Similarly, when the temperature of the cab approaches, meets, or passes below the low temperature threshold, the operator station monitor may call for starting the machine 100 to activate a heating system to heat the cab up. Alternatively, the operator station monitor may, more simply, activate an electrically powered heat pump or other heater to heat the cab.

The engine monitor 132 may be configured to monitor the engine and call for starting the work machine 100 to address particular conditions of the engine. For example, the engine monitor 132 may monitor the temperature of the engine oil in the engine and may use one or more threshold temperatures to trigger the start of the machine 100. Like the hydraulic system monitor 128, the temperature threshold may be based on a relationship between the temperature of the oil and the viscosity of the oil. That is, as oil decreases in temperature, it may become more viscous, which may inhibit its ability to flow and lubricate moving portions of the engine. Accordingly, when the temperature of the oil approaches, meets, or falls below the threshold, the engine monitor 132 may call for starting the machine 100 to generate heat within the engine and, thus, heat the engine oil. Alternatively, the engine monitor 132 may, more simply, activate an electrically powered heater or heat pump to heat the engine oil without fully staring the work machine.

As mentioned with respect to the hydraulic system monitoring component 128, the operator station monitor 130, and the engine monitor 132, these monitoring systems may relate to systems that may or may not require a full start of the machine 100 to address the issues identified. Accordingly, at box 138, the request generated by those monitoring systems may be a battery charge request (e.g., by way of starting an engine or generator) or may, instead, request a process that does not involve starting the engine of the work machine 100. Rather, the request may include operating a less involved aspect of the work machine 100, which may be fully contained and may not require the several checks discussed below with respect to the engine starting process.

Figure 6:
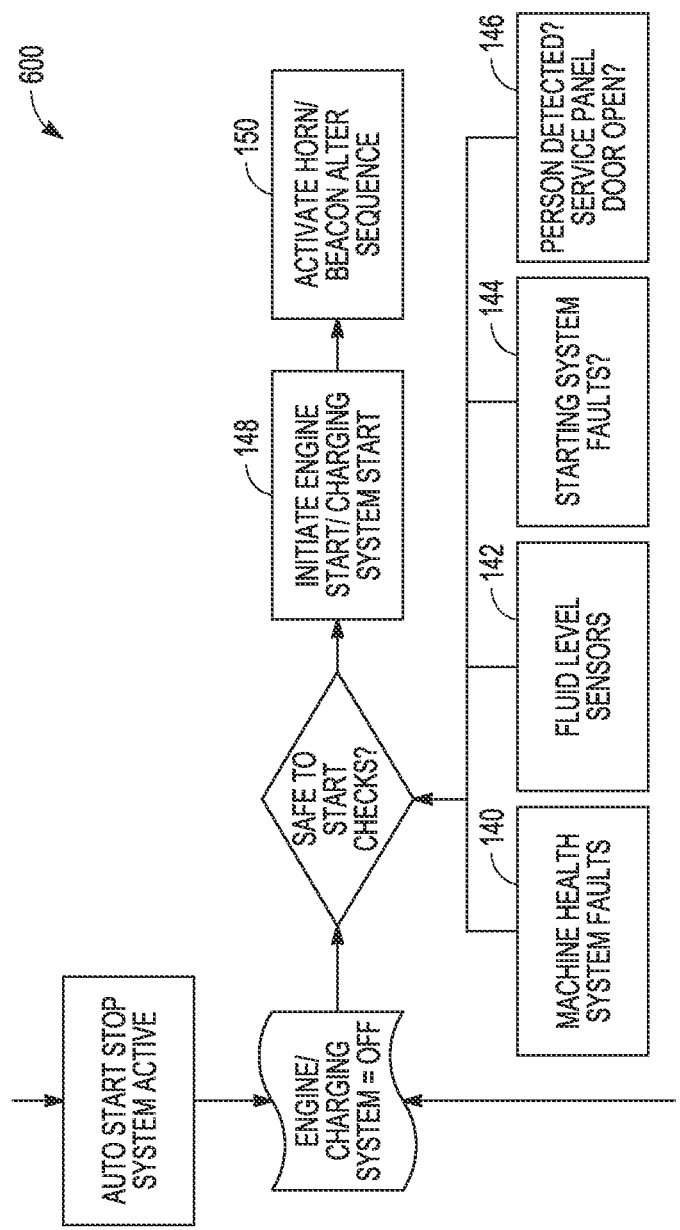
FIG. 6 is a close-up view of the engine starting process of the start/stop logic of FIG. 3, according to one or more examples.

Turning now to FIG. 6 and close-up view 600, in response to a battery charge request, and with the engine turned off, the automatic module 114 may be configured to perform an engine start process. As shown, this may include running a series of checks to determine if it is safe to start the engine. For example, the module may check for machine health faults 140 to make sure that starting the engine will not cause damage to the work machine 100 or that the machine 100 is in suitable condition for operation. In one or more examples, this may include checks for improper software/system configuration that would result in a critical fault and diagnostic. More particularly, this may include checking for any active critical fault relating to the machine such as software/hardware configurations, security lockouts, previous improper shutdown/DEF purge, etc before sending the request to the engine starting system. In addition, the module may check fluid levels 142 using data received from fluid level sensors. In one or more examples, this may include an oil fluid level in the engine, coolant fluid levels, brake fluid levels, and/or hydraulic fluid levels. In one or more examples, this may also include a fuel fluid level. In any of these cases, and with respect to any given fluid, the machine start process may be interrupted if the fluid does not meet a particular threshold. In some cases, if the fluid level is approaching or too close to the threshold, the start may be interrupted or if the fluid level is below the threshold, the start process may be interrupted. The module 114 may also check for starting system faults 144 such as mechanical abutment errors (mechanical misalignment), motor failures, and the like. Still further, the module 114 may check for the presence of persons or other conditions 146 that may cause starting of the engine to be unsuitable. For example, the module 114 may check to make sure that one or more service panels of the work machine 100 are not open, which may be indicative of the presence of a worker or mechanic working on the machine. In another example, cameras, scanners, motion sensors, or other radiation-based equipment may be used to survey the surroundings of the machine for the presence of persons, moving objects, or other things that may be of concern when starting a work machine.

If the series of checks are all clear, the automatic module 114 may start the engine and/or start the charging system 148. In one or more examples, this may include making an ignition connection to start the engine. With the engine running, a power takeoff system on the engine may mechanically drive an alternator, which may provide electrical power to the work machine 100, which may charge the battery and/or provide electrical power to fans, compressors, condensers, etc. that may be used to heat and/or cool particular aspects of the work machine. In the case of tethered machines or equipment, the system could, instead, enable current on the tether to charge the battery. The module 114 may also activate a horn or other beacon alert sequence 150 so that surrounding workers or personnel are alerted to the fact the work machine is starting. In one or more examples, the horn or other beacon alert sequence may occur after or during starting of the engine or the sequence may occur prior to staring the engine and a selected period of time may pass before the engine is started such that personnel or other workers may have time to process that the work machine is starting before it actually starts.

With the engine running, we now turn to the stop side of the diagram of FIG. 3. That is, the system may not only be an automatic "start" or "activation" module, but it may also be an automatic "stop" or "deactivation" module. As shown in the close-up view 700 of FIG. 7, the stop side of the diagram may utilize many of the same components as the start side including a battery monitor component 124, an offboard component 126, a hydraulic system monitoring component 128, an operator station monitor 130, and/or an engine monitor 132. While shown separately for purposes of the logic diagram of FIG. 3, the battery monitor component 124, for example, may be the same component that operates to monitor the battery for purposes of starting the machine, but also monitors the battery for purposes of stopping the machine. The same may be true of the other components. Accordingly, while they have been shown in two locations on the diagram, the component, subroutine, or other aspect of the automatic start/stop module may be a single component, separate components, or separate portions of the same component. Moreover, the stop side of the diagram also shows that the security system 134 component flows directly to the stop request and not through the battery monitor component 124, which is discussed in more detail below. Further, the stop side also has an engineless battery monitor component 152 which is also discussed below.

On the stop side of the process, the battery monitor component 124 may monitor the voltage and/or current of the battery and may call for the engine to stop when the battery reaches a threshold state of charge. This threshold may be a selected amount above the start threshold that allows for the work machine to remain off for a reasonable amount of time. That is, for example, if the battery monitor component called for starting the engine because the state of charge fell below the start threshold and then called for the engine to stop just as soon as the state of charge was above the start threshold, the work machine would likely need to be started and stopped quite often. Accordingly, the threshold state of charge at which the battery monitor component will call for stopping the machine may be relatively higher than the start threshold. The amount may be a predetermined amount or it may be based on data associated with the rate at which the state of charge of the battery is being drawn down and a desired amount of time between automatic starts. The rate of drawdown of the battery may depend on the number and types of systems that are operating when the machine is shutdown such as a security system, other systems that run when the machine is not turned on, or other parasitic load. Still other approaches to setting the stop threshold for the battery may be provided.

It is noted that just because the battery monitor component 124 is satisfied with the state of charge of the battery and issues a stop request, this may not, in and of itself, cause shutdown of the machine because other of the monitoring systems may still be calling for operation of the work machine. Accordingly, while a single monitoring component may be sufficient to trigger a starting operation on the start side of the diagram, one or more of the monitoring components on the stop side may be involved in calling for shutdown of the work machine. The number of components involved may depend on the nature of the basis for shutting down the work machine as discussed in more detail below.

The security system monitor component 134 may be configured to shutdown the machine to prevent or interrupt theft of the work machine. That is, while the security system on the start side was relevant for starting the machine because the security system requires a threshold amount of battery power, on the stop side, the securing system may function independently of the battery monitor component because it is functioning for a different purpose—preventing theft. Accordingly, should a security alarm or other sensor be triggered, the security system may request shutdown of the machine. In this case, and unlike the battery monitoring component 124, a single monitoring component on the stop side may be sufficient to cause shutdown of the work machine. That is, regardless of whether other systems on the work machine are still calling for power or otherwise have not issued a stop request, a stop request by the security system may override any other calls for power and shutdown the work machine.

The offboard component 126 on the stop side may be configured to allow shutting down the work machine for one or more reasons. For example, if the work machine 100 had been started based on a scheduled event (e.g., start of work shift, dealer showing, etc.), the offboard component 126 may call for shutdown of the machine when the date/day and time of the scheduled event has passed or when a selected amount of time since the start of the event has passed. That is, if a work shift was schedule to start at 7:00 AM on a particular day and the work machine has been started 20 minutes ahead of that start time, the offboard component may call for shutdown of the work machine at 7:15 AM. If, however, a user does arrive while the work machine is running, a hand off or other override may be triggered so that the work machine does not shutdown while in use, for example. The offboard component 126 may also function to shut down the work machine when instructed to do so by a remote user. For example, a remote operator may have completed work for a day or at the end of a shift and may instruct shutdown of the work machine. Since the offboard component is configured for offboard communications, this same component may be used by a remote operator to shutdown the work machine. In one or more other examples a remote operator or central managing office may shutdown the machine pursuant to a security alert. That is, in one or more examples, the security system 134 may alert an offsite manager of a security breach or potential security breach and the offsite manager may utilize a computing system, a phone app, or other software 136 to instruct shutdown of the work machine 100, which may flow through the offboard component 126. Still other scenarios may be envisaged where instructions to shutdown the work machine may be generated automatically or manually at an offboard location 136. Those instructions may be communicated to the offboard component 126 for shutting down the work machine 100. Depending on the nature of the offboard instructions, other monitoring components may or may not be checked before shutting down the work machine 100. That is, if the shutdown is a result of a scheduled start and corresponding shutdown, other systems may be checked before shutting down the work machine 100. However, if the shutdown is from a remote operator and due to a security issue, other systems might not be checked. Like the battery charge side of the system, depending on the nature of the instructions from the offboard component, the signal may be passed to the battery charge stop system or to other heaters or coolers, for example.

The hydraulic system monitoring component 128 and the operator station monitor 130 on the stop side may function similarly to the battery monitor component 124 on the stop side. That is, each system may call for stopping the machine when the hydraulic fluid temperature or the cab temperature, respectively, reaches a threshold that is a selected amount of above the "start" threshold. Further, the selected amount may be a predetermined amount or it may be calculated based on the rate of heating/cooling of the fluid and the amount of time desired between starting and stopping the work machine. Still other approaches to selecting the "delta" between the start threshold and the stop threshold may be provided.

The engine monitor 132 may function similar to the battery monitor component 124, the hydraulic system monitor 128, and the operator station monitor 130 by calling for shutdown of the work machine when, for example, the oil temperature rises to a threshold that is a selected amount above the "start" threshold. Like these other systems, the selected amount may be predetermined or calculated based on heating/cooling rates, etc. However, in addition, the engine monitor may also call for shutdown of the work machine when other conditions warrant or require it. For example, if the fuel level is diminishing below a minimum threshold such as below one eighth of a tank or below a quarter tank, the engine monitor may call for shutdown of the work machine to avoid running the work machine out of fuel. Other fluid level monitors may also be used to shut down the work machine such as low oil or low coolant. Still further, in the case of a diesel engine, if there is insufficient diesel exhaust fluid (DEF) to treat the exhaust gas, the engine monitor may shutdown the work machine. Still other engine conditions may be monitored by the engine monitor 132, which may give rise to calling for shutdown of the work machine.

The stop side of the module 114 may include an additional module (e.g., engineless machine monitor 152) for purposes of engineless systems. In these types of systems, requests may generally be calls for heating or cooling and they may leverage the battery power to operate the heating and cooling operations. However, at some point, the state of charge of the battery may fall below a selected threshold where the ability to operate the machine at all or for any reasonable amount of time may be at risk. In these situations, the engineless battery monitoring component 152 may call for shutting down any heating or cooling operations to conserve power for purposes of operating the work machine.

As with the start side, some of the stop requests of stop-side monitors may call for shutdown of the machine 100, while others, more simply, call for shutting down a heat pump or heater or shutting down a cooling system. On the stop side, a request for shutdown of the work machine or heating/cooling may involve checking to see if other systems are still calling for operation of the work machine or calling for heating/cooling. In many instances, a stop request by one monitoring component will be overridden by other monitoring components that are still calling for work machine operation and/or heating/cooling operations. In still other examples, checking with other systems will not occur because the basis for shutdown is paramount to the needs of these other systems. That is, as discussed, if the work machine is being shut down for security purposes, whether the cab is warm/cool enough may no longer take precedence. Moreover, if the work machine is nearly out of fuel or DEF or if an electric machine is nearly out of battery power, other priorities may fall by the wayside. Still other comparisons can be made as to the nature of the stop requests and the logical result of whether the work machine will be shut down or not.

As shown in close-up view 800 of FIG. 8, if a machine request is issued by one or more monitoring components and the request is paramount to other system needs or no other system is still calling for power, the automatic module 114 may perform a process of shutting down the work machine. The process may include a series of checks before shutting down the work machine, but it may be a relatively short list of checks. For example, the automatic module 114 may check to make sure auxiliary systems are shut down to avoid cutting power to them. Other checks may include avoiding a power loss 153 when the engine is shut down which may risk corrupting a software application or interrupting a critical communication process (offboarding of data or storage of critical info). Another check may include checking fluid levels 154. Another check may include confirming that the engine/EGR system achieved a high enough temp to burn off or purge the DEF 155. That is, there may be an established minimum time to allow to lapse between successful engine starts and stops for reliability purposes.

Once the checks are completed, the automatic start/stop system may turn the work machine off 156. A horn may sound or another beacon 158 may be activated to create a sound or sequence of sounds signifying that the work machine is being or has been shutdown.

INDUSTRIAL APPLICABILITY

In operation and use, the described work machine having an electronic control module with an automatic conditioning monitoring and control module 114 may start running and stop running from time to time or may activate aspects of the work machine and/or deactivate aspects of the work machine for a wide variety of reasons. The automatic module 114 may function to monitor a wide variety of factors, start the machine, or aspect thereof, when one or more factors fall below a respective threshold and stop the work machine, or aspect thereof, when one or more factors rise above a separate threshold. The work machine, or aspect thereof, may be started and stopped for related or unrelated reasons. The automatic module 114 may provide a holistic approach to work machine monitoring and control of several conditions of the work machine when the work machine would normally remain in an off condition. The described automatic module 114 may provide a more comprehensive monitoring and control system beyond simply a remote start system or a scheduled start system. For example, the present system may monitor machine conditions and start/stop the machine or aspects thereof based on machine conditions. As another example, even when starting the machine based on a schedule, the present system can do so based a work schedule, a dealer visit schedule or another schedule that may change from time to time and which the present system may adjust to by being in communication with offboard systems. As still another example, the present system may have multiple thresholds for starting and/or stopping, or activating/deactivating, including multiple thresholds within a single category (e.g., battery state of charge) and may accommodate the interplay of the several thresholds (e.g., multiple stop requests or a stop request from one component, but not others) to decide when it is suitable to start and/or stop the work machine and/or to activate/deactivate heating/cooling systems.

In one or more examples, a method 200 of monitoring and controlling a machine may be provided. The method may include activating 202 an automatic module and monitoring 204 the work machine using one or more of a battery monitor component, an offboard component, a hydraulic system monitoring component, an operator station monitor, and/or an engine monitor. Based on the monitoring of the one more components, the method may include requesting 206 a battery charge. Where heating and/or cooling are requested, the system may activate 208 the respective heating and/or cooling system. In some cases, it may first check to see if there is sufficient battery power to do so. Where a battery charge is requested, the system may perform 210 a series of start checks as described above. If the start checks are clear, the system may start 212 the engine and issue 214 an alert.

The method may also include monitoring the running work machine to determine if the work machine may be or should be shutdown. The method may include monitoring 216 the work machine using one or more of a battery monitor component, a security system, an offboard component, a hydraulic system monitoring component, an operator station monitor, an engine monitor, and/or an engineless machine monitor. Based on the monitoring of the one or more components, the method may include requesting 218 shutdown of the work machine and/or requesting shutdown of a heating and/or cooling system. Where heating/cooling system shutdown is requested, the system may check 220 to see if other components or systems are in need of further heating/cooling and where none are found, the system may shutdown 222 the heating/cooling system. Where shutdown of the work machine is requested, depending on the basis for the request, the system may check 224 to see if other components are in need of further operation of the work machine and where none are found, the system may perform 226 a series of checks, shutdown 228 the work machine and issue an alert 230. Where the request to shutdown is paramount to other requests, the system may proceed to shutdown the machine (e.g., checks, shutdown, and alert) without checking to see if other systems are still in need of further operation of the work machine.

The above detailed description is intended to be illustrative, and not restrictive. The scope of the disclosure should, therefore, be determined with references to the appended claims, along with the full scope of equivalents to which such claims are entitled.

What is claimed is:

1. An automatic condition monitoring and control system for a work machine, comprising:
    an electronic control module configured for arrangement on the work machine and configured to:
    monitor multiple conditions of the work machine;
    compare the multiple conditions to respective thresholds;
    at least one of:
        start an engine of the work machine based on at least one of the comparisons; and
        activate a heating or cooling system based on at least one of the comparisons;
    check that no other system of the work machine is calling for machine operations; and
    if no other system of the work machine is calling for machine operations, stop the work machine based on at least one of the comparisons.

2. The system of claim 1, wherein the multiple conditions includes a state of charge of a battery of the work machine.

3. The system of claim 2, wherein the electronic control module is configured to compare the state of charge of the battery to a first threshold selected to maintain the battery above a state of charge capable of starting the engine.

4. The system of claim 3, wherein the electronic control module is configured to compare the state of charge of the battery to a second threshold selected to maintain the battery above a state of charge capable of running a security system.

5. The system of claim 1, wherein the electronic control module is configured to compare the temperature of a fluid to a threshold selected to maintain the fluid above a safe operating temperature.

6. The system of claim 5, wherein the fluid is hydraulic fluid.

7. The system of claim 5, wherein the temperature is engine oil.

8. The system of claim 1, wherein the electronic control module is configured to compare the temperature of an operator station to a threshold selected to prevent damage to electronics or equipment in the operator station.

9. The system of claim 1, wherein the electronic control module is configured to compare the temperature of an operator station to a threshold selected for an operator to be comfortable.

10. The system of claim 1, wherein the electronic control module is further configured to monitor a schedule of events and start the engine of the work machine at a time before the event defining a lead time.

11. The system of claim 10, wherein the lead time is a predetermined lead time.

12. The system of claim 10, wherein the lead time is calculated based on one or more conditions of the work machine and a time required to change the condition.

13. The system of claim 1, wherein the electronic control module is configured to perform a series of checks when starting the engine.

14. The system of claim 13, wherein start an engine comprises activating an audible alert.

15. A work machine comprising:
a frame;
an engine operable by the electronic control module of claim 1;
a ground engaging system operably coupled to the engine;
an implement operably connected to the frame;
a hydraulic system configured for operating the implement; and
the automatic condition monitoring and control system of claim 1.

16. The system of claim 1, wherein monitoring of the multiple conditions of the work machine is triggered automatically upon shutdown of the work machine.

17. The system of claim 1, wherein the electronic control module is further configured to deactivate the automatic condition monitoring and control system under particular conditions.

18. An automatic condition monitoring and control system for a work machine, comprising:
an electronic control module configured for arrangement on the work machine and configured to:
monitor multiple conditions of the work machine;
compare the multiple conditions to respective thresholds;
start an engine of the work machine based on at least one of the comparisons; and
monitor a schedule of events and start the engine of the work machine at a time before the event defining a lead time, wherein the lead time is calculated based on one or more conditions of the work machine and a time required to change the condition.

19. An automatic condition monitoring and control system for a work machine, comprising:
an electronic control module configured for arrangement on the work machine and configured to:
monitor multiple conditions of the work machine;
compare the multiple conditions to respective thresholds; and
at least one of:
start an engine of the work machine based on at least one of the comparisons; and
activate a heating or cooling system based on at least one of the comparisons, wherein, a type of condition of the multiple conditions of the work machine that are monitored is selectable by an operator based on a type of downtime that the operator anticipates.

20. The automatic condition monitoring and control system of claim 19, wherein the multiple conditions of the work machine are displayed in order of threshold value such that selection of the type of condition inherently selects all conditions with a lower threshold.

* * * * *